United States Patent [19]

Nishibe et al.

[11] Patent Number: 4,845,656

[45] Date of Patent: Jul. 4, 1989

[54] SYSTEM FOR TRANSFERRING DATA BETWEEN MEMORIES IN A DATA-PROCESSING APPARATUS HAVING A BITBLT UNIT

[75] Inventors: Shinji Nishibe, Hachioji; Mikio Shiraki, Tokyo, both of Japan

[73] Assignee: Kabushiki Kaisha Toshiba, Kawasaki, Japan

[21] Appl. No.: 940,006

[22] Filed: Dec. 10, 1986

[30] Foreign Application Priority Data

Dec. 12, 1985 [JP] Japan ............ 60-277867

Dec. 12, 1995 [JP] Japan ............ 60-277868

[51] Int. Cl.[4] ............ G06F 9/00

[52] U.S. Cl. ............ 364/900; 364/942.6; 364/941.4; 364/923.81

[58] Field of Search ............ 364/200, 900

[56] References Cited

U.S. PATENT DOCUMENTS 4,555,775 11/1985 Pike ............ 364/900

4,685,070 8/1987 Flinchbaugh ............ 364/521

4,700,320 10/1987 Kapur ............ 364/521

*Primary Examiner*—Gareth D. Shaw

*Assistant Examiner*—John G. Mills

*Attorney, Agent, or Firm*—Finnegan, Henderson, Farabow, Garrett, & Dunner

[57] ABSTRACT

A data-processing apparatus provided with a bit boundary block transfer unit. A CPU forms a list of parameters required for transferring characters forming one block of text, and stores the list in a memory. A parameter control section of the boundary block transfer unit sequentially reads the parameters, and writes them in a parameter file. Meanwhile, the CPU processes the data. When the block of text has been transferred, an interrupt is supplied to the CPU. The CPU can form a list of only those parameters which must be changed for characters of the same type. These parameters are rewritten as the characters are transferred, one by one. In another data-processing apparatus of the invention, a CPU loads a register with data showing the type of characters to be transferred. It can input a variable parameter to a memory storing fixed parameters. When the variable parameter is set in both the memory and the register, a first selector selects one parameter for one character of the type specified by the data set in the register. This parameter is further selected by a second selector when the register stores said data. When the register does not store said data, the second selector selects the parameter for one character. Any parameter selected by the second selector is set in a parameter file. A data-transferring circuit transfers one character according to the parameter set in the parameter file.

6 Claims, 9 Drawing Sheets

SYSTEM FOR TRANSFERRING DATA BETWEEN MEMORIES IN A DATA-PROCESSING APPARATUS HAVING A BITBLT UNIT

BACKGROUND OF THE INVENTION

The present invention relates to a data-processing apparatus having a bitblt (bit boundary block transfer) unit for transferring data between memories at high speed.

Recently, work stations have been developed which can process various types of data, such as characters, graphics and images. The general trend is that the new data-output technique known as "bit map control" is used in the work stations of this kind, in order to provide image data which is easy for users to understand. The bit map control requires a high-speed data transfer unit, generally called a "bitblt unit," in order to quickly display characters in desired positions on the screen of a display. The term "bitblt" stands for "bit boundary block transfer," and is also known as a "raster operation." This technique of transferring data at high speed consists of designating, in the unit of bits, a desired one o the data pieces stored in a display memory, then transferring the data piece to a display, and finally displaying the data piece in a desired rectangular region of the screen of the display.

In such a work station, character data, such as Chinese characters and alphanumeric characters, is transferred between a main memory and a display memory. It will now be briefly explained how the data is transferred.

First, the CPU in the work station sets parameter data in the parameter file provided within a bitblt unit. The parameter data is necessary for transferring characters, one by one, from the main memory to the display memory, or vice versa. It consists of addresses, data lengths, and the like. More precisely, the parameter data includes:

(1) Source address upper bit
(2) Source address lower bit
(3) Destination address upper bit
(4) Destination address lower bit
(5) Source x-direction length
(6) Destination x-direction length
(7) Source y-direction length
(8) Destination y-direction length
(9) Source x-direction scaler
(10) Destination x-direction scaler
(11) Source y-direction scaler
(12) Destination y-direction scaler
(13) Source address-increment upper bit
(14) Source address-increment lower bit
(15) Source address-skip upper bit
(16) Source address-skip lower bit
(17) Destination address-skip upper bit
(18) Destination address-skip lower bit
(19) Source x-direction displacement
(20) Destination x-direction displacement
(21) Source y-direction displacement
(22) Destination y-direction displacement
(23) Source x-direction scaler displacement
(24) Destination x-direction scaler displacement
(25) Source y-direction scaler displacement
(26) Destination y-direction scaler displacement Then, the data transfer circuit provided in the work station reads the data from the parameter file. In accordance with the data, the circuit generates interrupts, each after any one-character of data has been transferred. These interrupts are supplied to the CPU.

Most of the parameters required for transferring Chinese characters and alphanumeric characters are fixed or invariable. In the conventional method of transferring data, one parameter must be provided for one character. Hence, the data cannot be processed at high speed. Further, since one interrupt must be generated upon completion of transfer of each character, the CPU will inevitably be overloaded.

SUMMARY OF THE INVENTION

It is an object of the present invention to provide a data-processing apparatus which is simple in structure and can, nonetheless, transfer data between memories at an extremely high speed.

According to the invention, there is provided a data-processing apparatus provided with a bit boundary block transfer unit, said apparatus comprising:

memory means for storing a list of parameters required for transferring characters forming one text;

a list pointer register for storing pointers representing locations where the parameters are stored in said memory means;

a parameter file for storing the parameters required for transferring characters;

a parameter control section for reading a parameter from the memory means in accordance with each of the pointers stored in the list pointer register, and for setting the parameter for one character in the parameter file;

a data transfer circuit for transferring characters, one by one, in accordance with the parameters stored in the parameter file; and an interruption circuit for determining that the data transfer circuit has transferred the characters forming one text, and generating an interrupt signal representing that the text has been transferred.

In the apparatus, no interrupt signal is generated before one text or a string of characters of the same type is transferred. Hence, the load of a CPU can be reduced. Further, since it suffices to prepare a list of only those parameters which must be changed for characters of the same type, and then to rewrite only these parameters, the data can be processed at high speed. As a result, the data can be transferred between memories at high speed.

BRIEF DESCRIPTION OF THE DRAWINGS

Other objects and features of the invention will be apparent from the following description taken in connection with the accompanying drawings, in which.

DETAILED DESCRIPTION OF THE PREFERRED EMBODIMENTS

Figure 1:
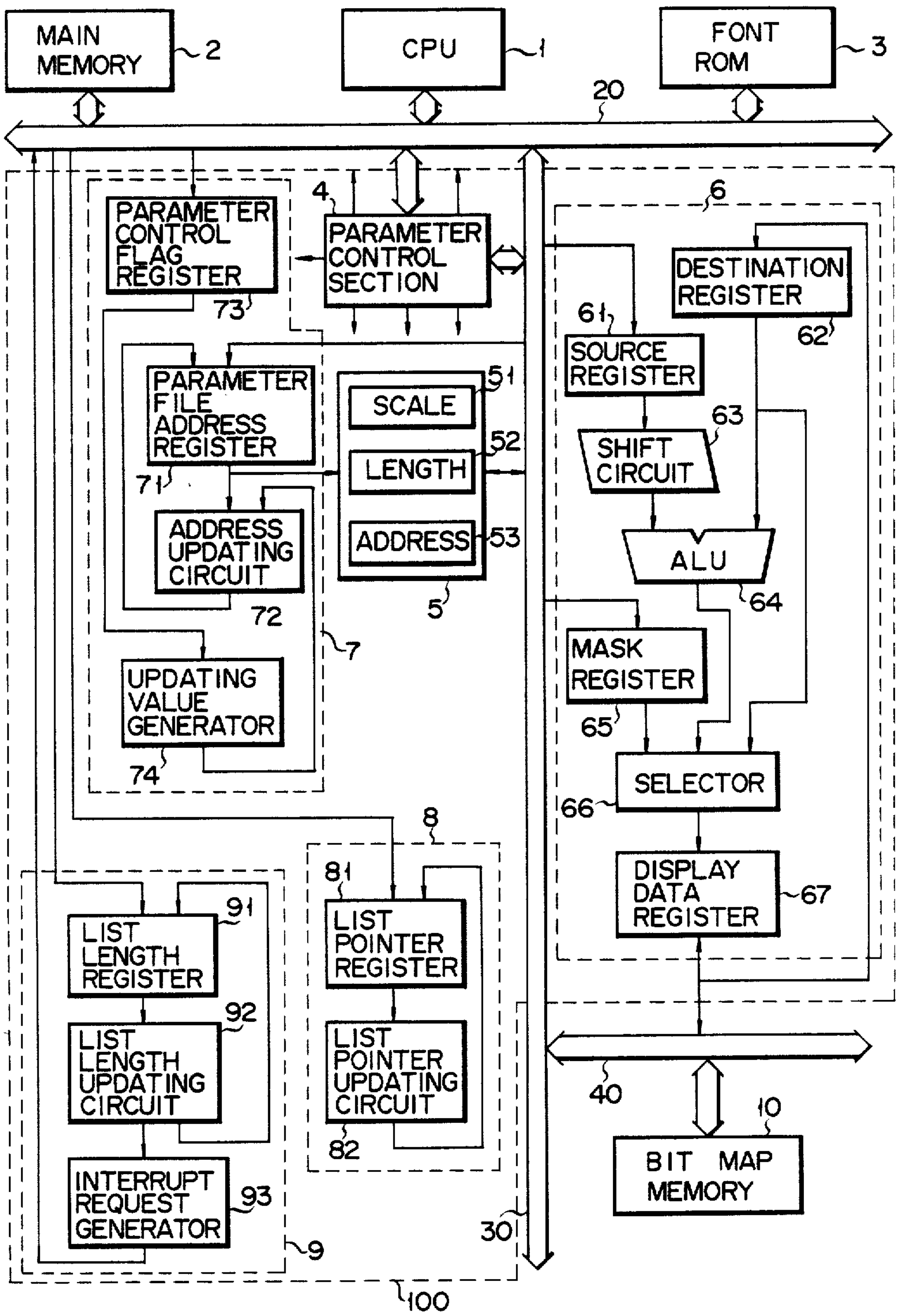
FIG. 1 is a block diagram of a system for transferring data between the memories provided within a data-processing apparatus having a bitblt unit, according to one embodiment of the present invention.

As is shown in FIG. 1, CPU 1 is connected by system bus 20 to main memory 2, font ROM 3, and bitblt unit 100. Bitblt unit 100 is coupled by display bus 40 to bit map memory 10. From a functional point of view, bitblt unit 100 comprises parameter control section 4, parameter file 5, data-transferring circuit 6, file address-updating circuit 7, memory address-updating circuit 8, and interruption circuit 9. CPU 1 prepares a list of parameters within main memory 2. CPU 1 supplies data, addresses and control signals to parameter control section 4, memory address-updating circuit 8, and interruption circuit 9.

Memory address-updating circuit 8 comprises list pointer address register 81 and list pointer-updating circuit 82. The addresses of the parameters prepared by main memory 2 are set in list pointer address register 81. List pointer-updating circuit 82 updates the addresses set in register 81. Interruption circuit 9 comprises list length register 91, list length-updating circuit 92, and interrupt request generator 93. The number of characters forming one text is set in list length register 91. Alternatively, the number of characters forming strings of the same type is set in register 91. List length-updating circuit 92 changes the number of characters. Interrupt request generator 93 generates an end interrupt when the number of characters set in register 91 reduces to zero.

Parameter control section 4, parameter file 5, data-transferring circuit 6, and file address-updating circuit 7 are connected to memory bus 30. Parameter file 5 is a buffer for storing parameters required for transferring data. More specifically, parameters such as SCALE 51 representing a magnification or reduction factor, LENGTH 52 indicating the length of data to be transferred, and ADDRESS 53 specifying a source or destination address.

File address-updating control circuit 7 comprises parameter file address register 71, address-updating circuit 72, parameter control flag register 73, and updating value generator 74. Register 71 stores the addresses of the parameters set in parameter file 5. Parameter control flag register 73 stores a "1" bit corresponding to any parameter to be changed. Updating value generator 74 calculates the value by which the parameter should be changed, in accordance with the contents of parameter control flag register 73. Address-updating circuit 72 updates the addresses set in register 71, in accordance with the value calculated by updating value generator 74.

Data-transferring circuit 6 comprises source register 61, destination register 62, shift circuit 63, ALU (Arithmetic Logic Unit) 64, Mask register 65, selector 66, and display data register 67. Source data is set in source register 61. Destination data is set in destination register 62. Shift circuit 63 shifts the source data by a given number of bits. ALU 64 carries out a logic operation on the source data thus shifted and the destination data. Mask register 65 stores mask data. Selector 66 selects the output data of ALU 64 or the destination data set in register 62 in accordance with the mask data set in register 65. The output data of selector 66 is set in display data register 67.

Font ROM 3 is a memory storing the patterns of characters such as Chinese characters and alphanumeric characters. Parameter control section 4 receives control data from CPU 1, reads the parameters from the list stored in main memory 2, and sets these parameters in parameter file 5. Further, section 4 supplies the addresses stored in parameter file 5 to file address-updating control circuit 7. Thereafter, section 4 reads the character patterns from font ROM 3 in accordance with the parameters stored in parameter file 5, and then supplies these patterns to source register 61 of data-transferring circuit 6. Simultaneously, parameter control section 4 sets necessary data in mask register 65. Data-transferring circuit 6 performs a logic operation (i.e., an operation on bits) in accordance with the data set in mask register 65. The results of this operation are input to display data register 67. The output data of register 67, i.e., the display data, is written in bit map memory 10 under the control of parameter control section 4.

Figure 2A:
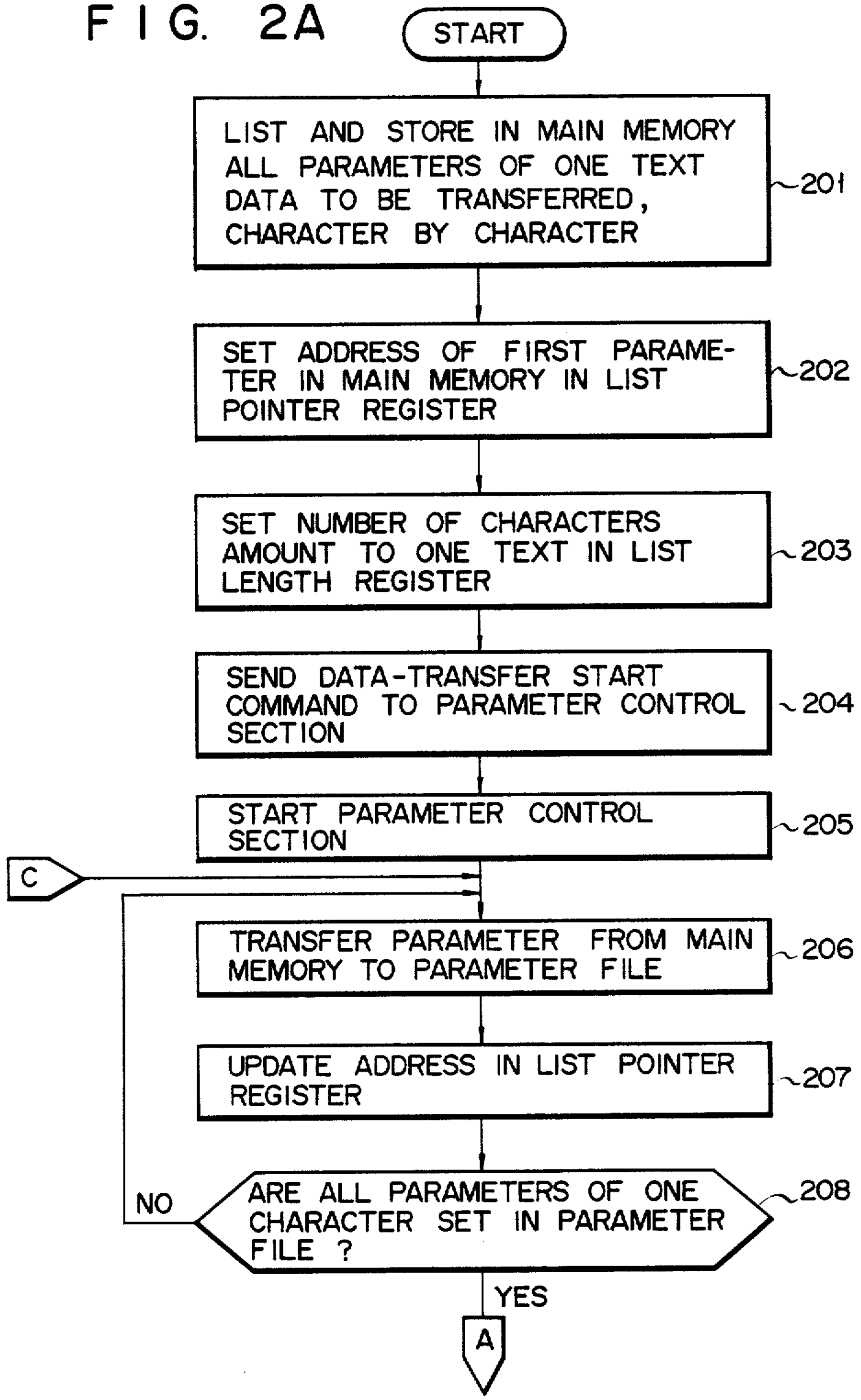
FIGS. 2A and 2B form a flow chart explaining the operation which the system shown in FIG. 1 performs to prepare a list of all parameters required for transferring characters.
Figure 2B:
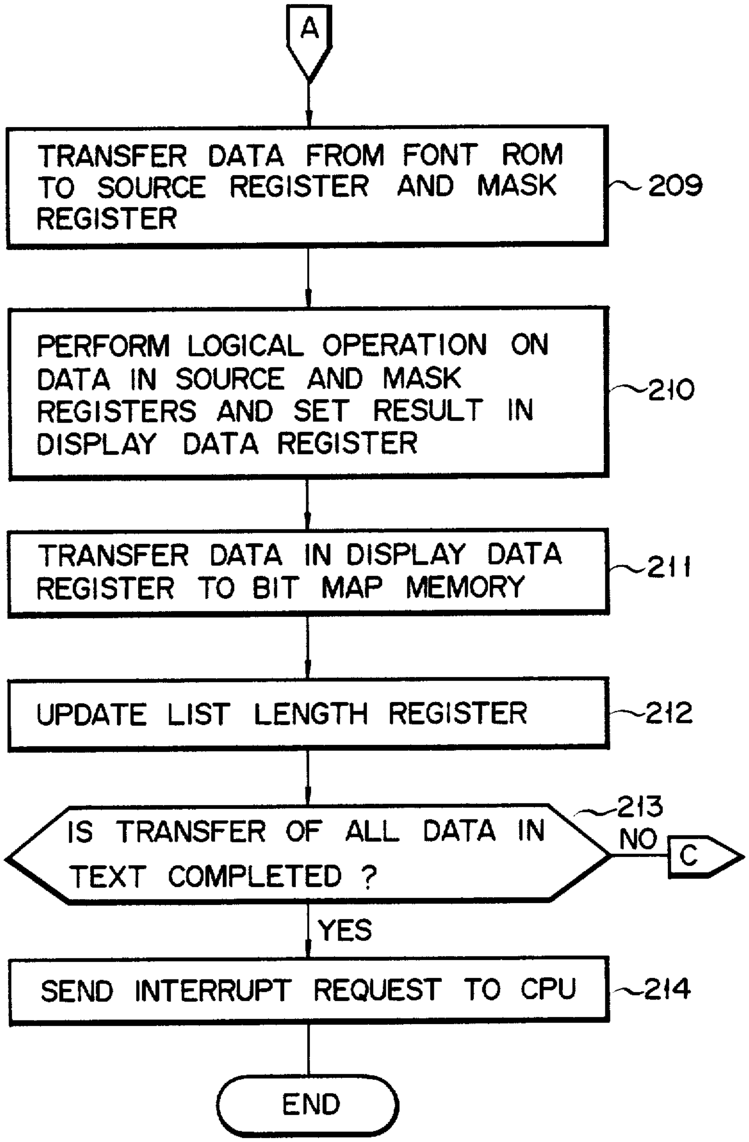
Figure 3A:
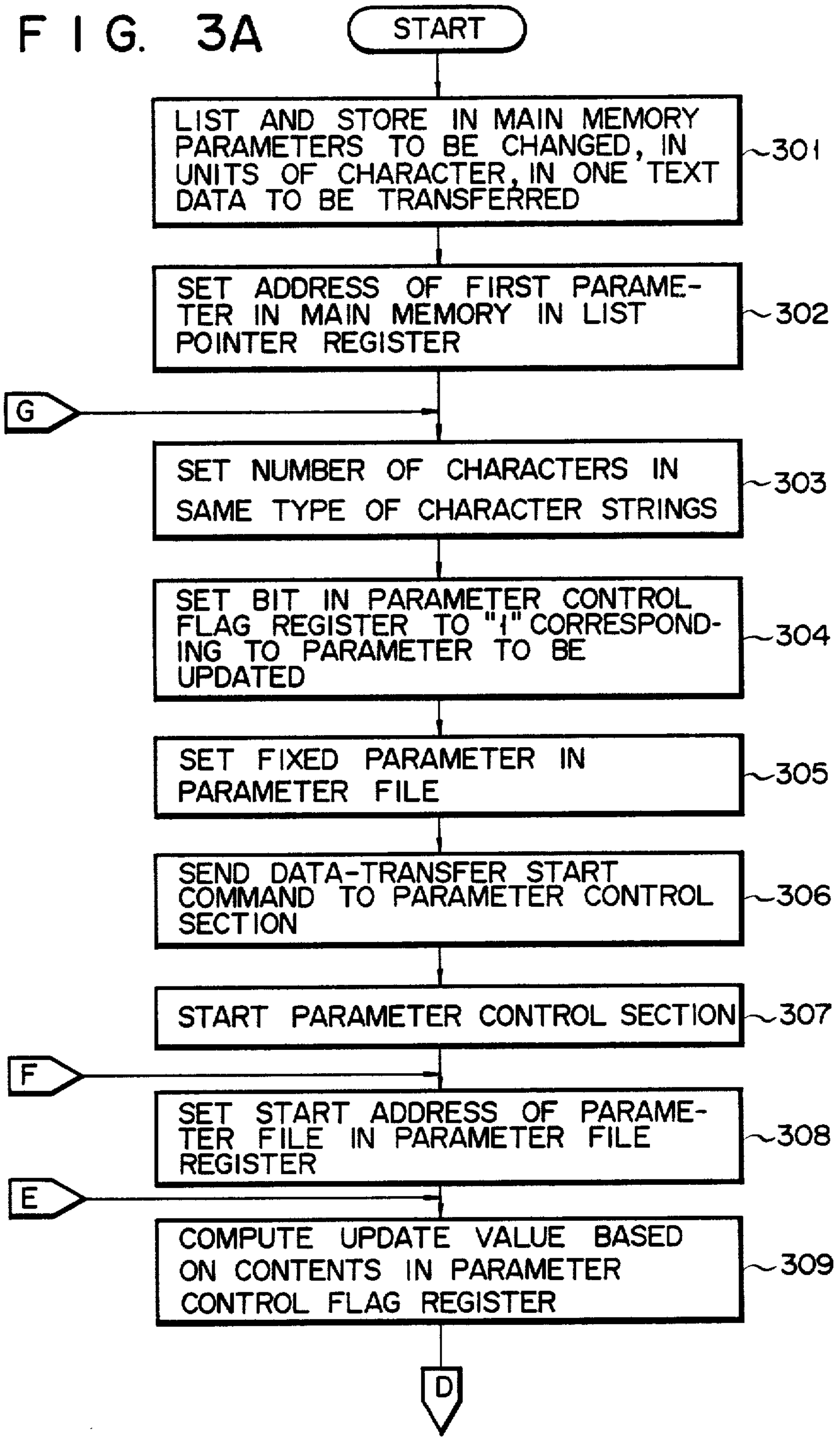
FIGS. 3A and 3B form a flow chart illustrating the operation which the system shown in FIG. 1 performs to prepare a list of only those of the parameters which must be changed for characters of the same type.
Figure 3B:
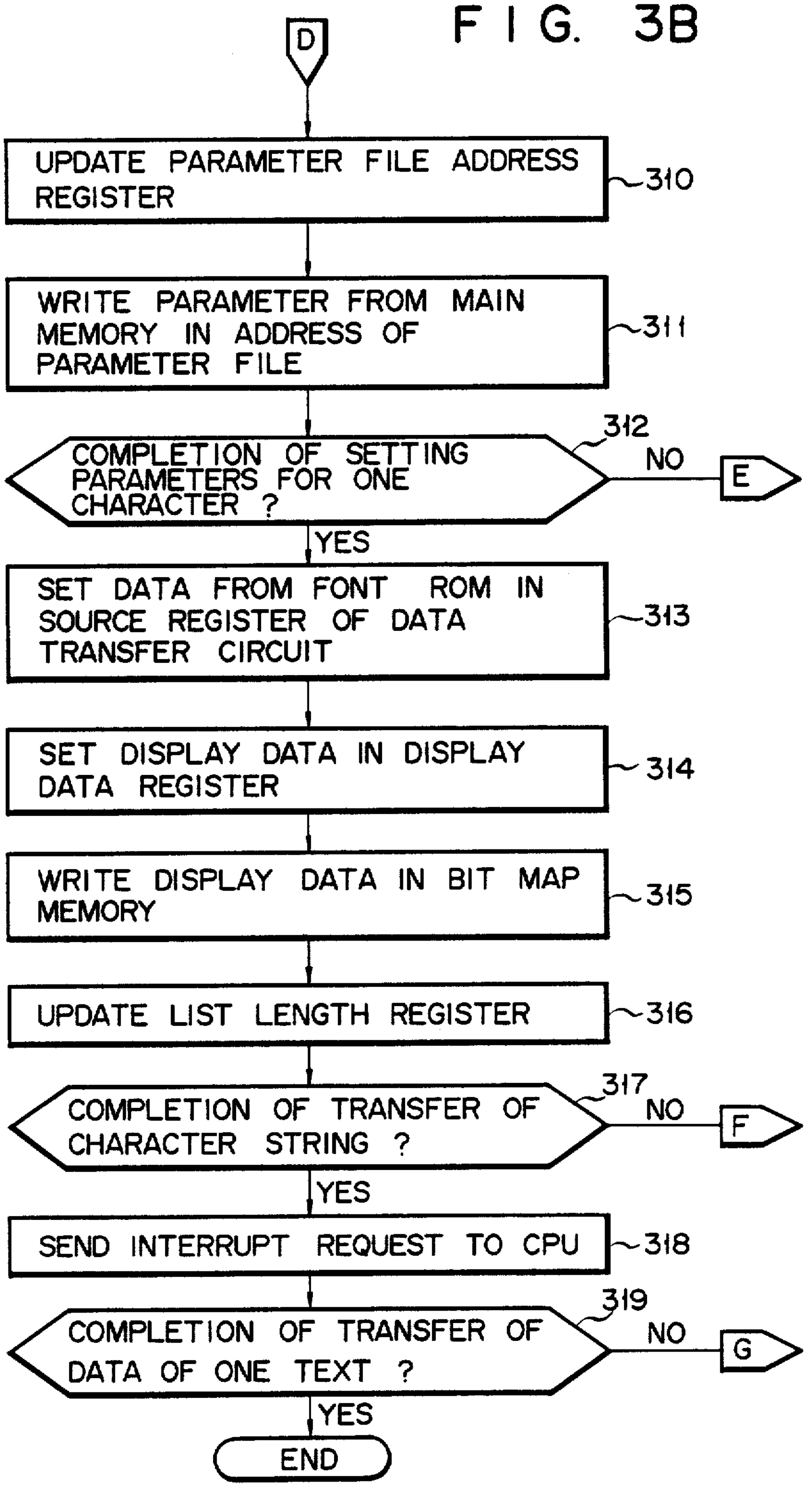

The operation of the system shown in FIG. 1 will now be explained with reference to FIGS. 2A and 2B, and also to FIGS. 3A and 3B.

In order to form a list of parameters, and to transfer character patterns to bit map memory 10, the system performs the following steps, as will be described with reference to FIGS. 2A and 2B.

First, in step 201, CPU 1 prepares a list of all parameters required for transferring character patterns to bit map memory 10, and stores this list in main memory 2. The list of parameters, thus, stored in main memory 2, corresponds to one block of text data to be transferred to bit map memory 10. In step 202, CPU 1 sets the address of the first parameter in list pointer register 81. Then, in step 203, CPU 1 sets the number of characters forming the one block of text data, in list length register 91. In step 204, CPU 1 gives parameter control section 4 a command for starting transfer of data. As a result, in step 205, parameter control section 4 starts performing its function. In the next step 206, section 4 writes the first parameter from main memory 2 into parameter file 5 in accordance with the address set in list pointer register 81. In step 207, list pointer-updating circuit 82 updates the address set in register 81. Hence, the first parameter is set in parameter file 5. Thereafter, in step 208, CPU 1 determines whether or not the parameter for one character has been set in parameter file 5. When YES as in this instance, in step 209, parameter control section 4 reads the pattern of a character, such as a Chinese character, a Japanese hiragana, or an alphanumeric character, from font ROM 3 in accordance with the parameter set in parameter file 5, and stores this character pattern in source register 61 and also in mask register 65. In step 210, data-transferring circuit 6 performs a logic operation (e.g., ORing) on the character pattern data stored in registers 61 and 65. The character pattern data, which has been subjected to this logic operation, is then supplied to display data register 67. In step 211, parameter control section 4 writes the character pattern data from register 67, i.e., the display data, into bit map memory 10. Consequently, the first character pattern is transferred to bit map memory 10. In the next step 212, list length-updating circuit 92 updates the data stored in list length register 91, i.e., the number of characters forming the one block of text. In step 213, CPU 1 determines whether or not all character patterns forming the one block of text have been transferred to bit map memory 10. If YES, interrupt request generator 93 supplies an interrupt request to CPU 1. The, interrupt request indicates that the one block of text has been transferred to bit map memory 10. If NO in step 213, the flow returns to step 206, whereby steps 206 and 207 are repeated to transfer the second character pattern to bit map memory 10. In this case, step 208 is repeated to determine whether or not the parameter for the second character has been set in parameter file 5. If YES, the flow goes to the next step 219. If NO, the flow returns to step 206.

Preparation of a list of only those of the parameters which must be changed for characters of the same type, and then to transfer to bit map memory 10 the character patterns, will be described with reference to FIGS. 3A and 3B.

First, in step 301, CPU 1 prepares a list of the parameters which must be changed for characters of the same type, and then stores this list in main memory 2. In step 302, CPU 1 sets the address of the first parameter in list pointer register 81. Then, in step 303, CPU 1 sets the number of the characters of the same type in list length register 91. Then, in step 304, CPU 1 sets the parameter control flag in register 73 to binary value "1" for the first parameter to be changed. Further, in step 305, CPU 1 writes a fixed character in parameter file 5. In the next step 306, CPU 1 gives parameter control section 4 a command for starting the transfer of data. As a result, in step 307, section 4 starts performing its function. Consequently, in step 308, section 4 writes the first address of parameter file 5 into parameter file address register 71. In step 309, updating value generator 74 computes the updating value from the contents of parameter control flag register 73.

Thereafter, in step 310, address-updating circuit 72 updates the address set in register 71, in accordance with the updating value computed by updating value generator 74. In step 311, parameter control section 4 sets the parameter, which is stored in main memory 2, at that address of parameter file 5 which is designated by the contents of parameter address register 71. It is in accordance with the address stored in list pointer register 81 that section 4 sets this parameter in parameter file 5. In step 312, CPU 1 determines whether or not the parameter for one character has been set in parameter file 5. If NO, the flow returns to step 309, and steps 309, 310, 311 are repeated, setting the parameter in parameter file 5.

If YES in step 312, processing continues with step 313. In this step, parameter control section 4 reads the pattern of the character corresponding to the parameter set in file 5 from font ROM 3, and inputs this pattern to source register 61 of data-transferring circuit 6 and also to mask register 65. In the next step 314, circuit 65 performs a logic operation on the pattern data stored in registers 61 and 65, thus providing display data. The display data is written in display data register 67. In step 315, parameter control section 4 writes the display data in bit map memory 10. Hence, the first character has been transferred to bit map memory 10.

Thereafter, in step 316, list length-updating circuit 92 updates the contents of list length register 91. In step 317, CPU 1 determines whether or not a string of characters of the same type has been transferred to bit map memory 10. If NO, in step 317, the flow returns to step 308. Hence, steps 308 to 316 are repeated to transfer the character to bit map memory 10. If YES in step 317, the flow goes to step 318. In this step, interrupt request generator 93 of interruption circuit 9 supplies an interrupt request to CPU 1. As a result, in step 319, CPU 1 determines whether or not all characters of one block of text have been transferred to bit map memory 10. If NO, the flow returns to step 303. In this case, steps 303 to 319 are repeated until the whole block of text is transferred to memory 10.

Figure 4:
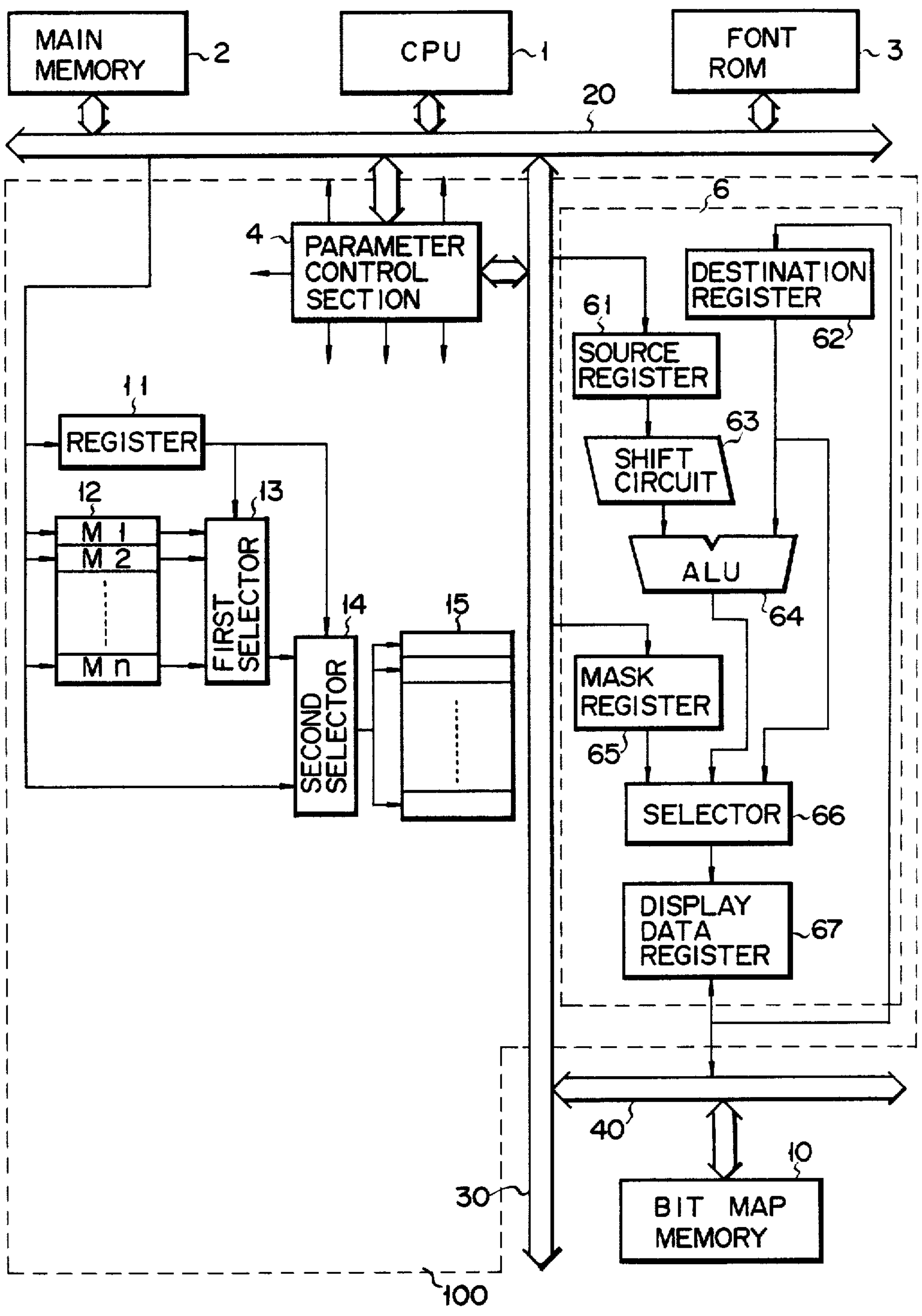
FIG. 4 is a block diagram showing another embodiment of the present invention.

FIG. 4 is a block diagram showing another embodiment of the present invention. In this figure, the same numerals denote the same components as shown in FIG. 1, and these components will not described in detail.

The system shown in FIG. 4 comprises CPU 1, main memory 2, and font ROM 3, all being connected to system bus 20. Bitblt unit 100 is coupled to system bus 20. Unit 100 comprises parameter control section 4 and data-transferring circuit 6. It also comprises register 11, memory 12, both coupled to system bus 20. The value specific to the type of the characters to be transferred is set in register 11. Memory 12 stores fixed parameters Ml to Mn, which are required for transferring n different types of characters, respectively. That is to say, memory 12 has storage areas for these fixed parameters, each area being large enough to store other parameters in addition to the fixed parameter. Register 11 and memory 12 are connected to CPU 1 by system bus 20. Of parameters Ml to Mn, stored in memory 12, the parameter corresponding to the value set in register 11 is selected by first selector 13. The value set in register 11 is input to second selector 14, and the output of first selector 13 is also input to second selector 14. Further, the parameter supplied from CPU 1 is input to second selector 14 through system bus 20. Second selector 14 selects the parameter selected by first selector 13, when the value set in register 11 specifies the type of the characters to be transferred. It selects the parameter output from CPU 1, when the value set in register 11 does not specify the type of the characters to be transferred. The output of second selector 14 is supplied to parameter file 15.

Figure 5A:
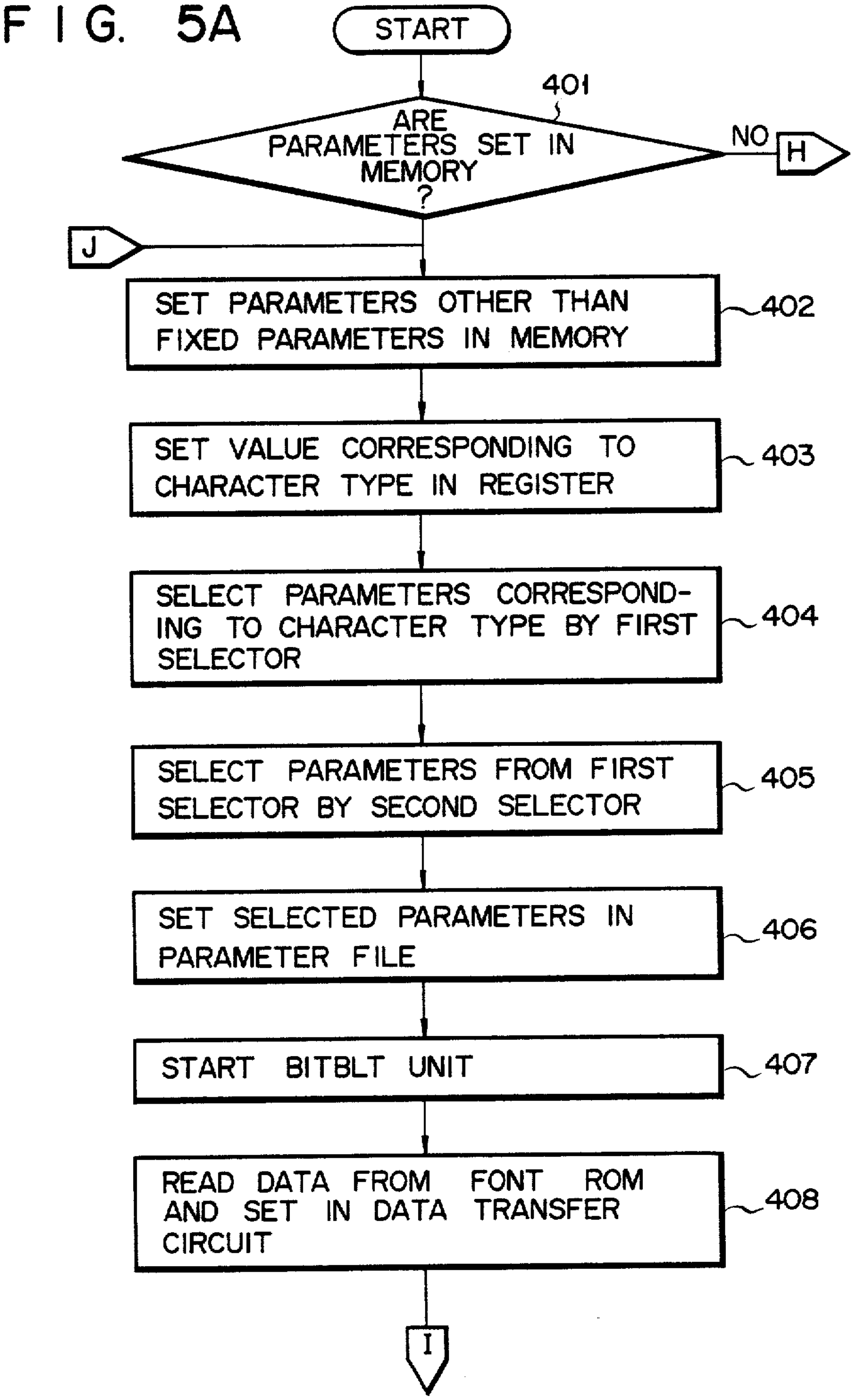
FIG. 5A through FIG. 5C form a flow chart showing the operation which the system shown in FIG. 4 performs to transfer the strings of characters stored in a main memory to a bit map memory.
Figure 5B:
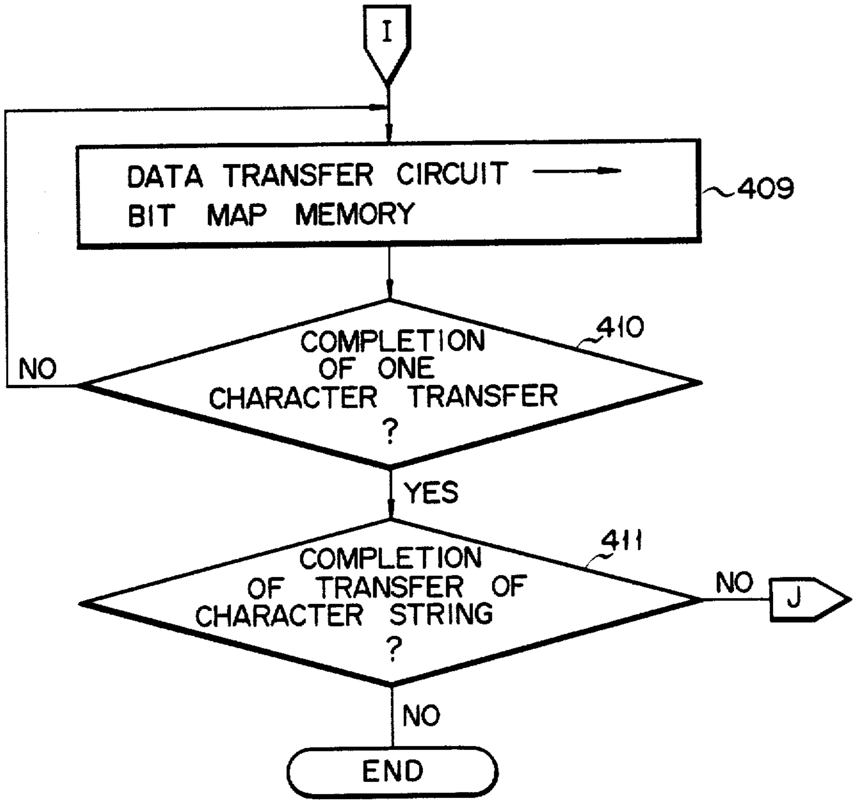
Figure 5C:
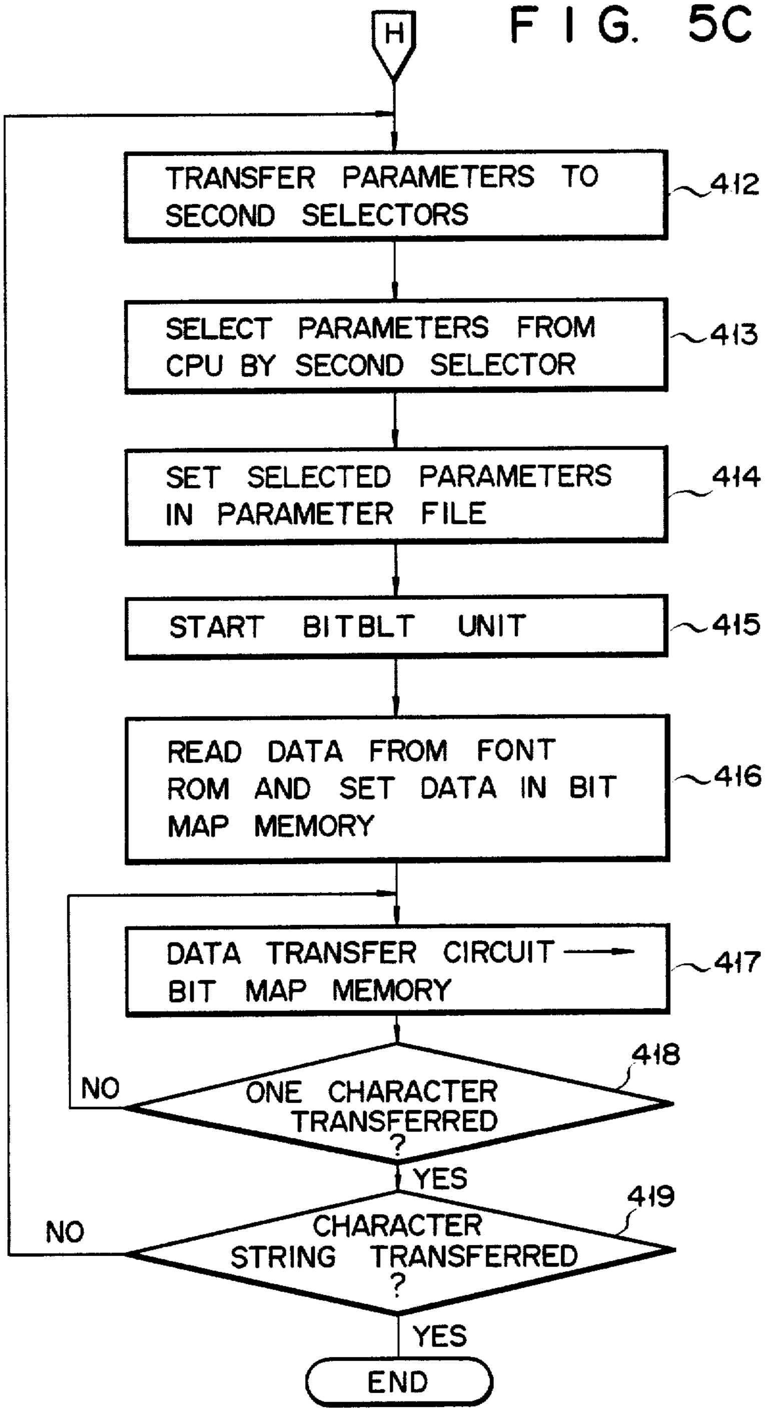

It will now be explained how the system of FIG. 4 operates to transfer character strings from main memory 2 to bit map memory 10, with reference to FIGS. 5A and 5B.

First, in step 401, CPU 1 determines whether or not other parameters should be set in memory 12. If YES, in step 402, CPU 1 sets the parameters other than the fixed ones Ml to Mn, in the respective storage areas of memory 12. (Fixed parameters Ml to Mn have been already stored in memory 12.) In the next step 403, CPU 1 sets the value specific to the type of the characters to be transferred to bit map memory 10, in register 11. In step 404, first selector 13 selects one of fixed parameters Ml to Mn, which is specified by the value set in register 11. In step 305, second selector 14 selects the parameter selected by first selector 13. This is because register 11 stores the value corresponding to the type of the character which is to be transferred to bit map memory 10. In step 406, the parameter thus selected is stored in parameter file 15. In step 407, CPU 1 causes bitblt unit 100 to start. In the next step 408, bitblt unit 100 reads the character patterns of the type specified by the value set in register 11, from font ROM 3, and inputs these character patterns to data-transferring circuit 6. In step 409, data-transferring circuit 6 performs a logic operation on these character patterns and the data stored in destination register 62, thereby providing display data, and writes this display data in bit map memory 10. In step 410, CPU 1 determines as to whether or not one character has been transferred to bit map memory 10. If NO, the flow returns to step 409. On the other hand, if YES in step 410, the flow goes to step 411. In this step, CPU 1 determines whether or not one string of characters has been transferred to bit map memory 10. If NO, the flows returns to step 402. Subsequently, steps 402 to 411 are repeated until the string of characters is transferred.

If no value corresponding to type of characters to be transferred is set in register 11, that is, when the parameter output from CPU 1 needs to be directly set in parameter file 15, the flow goes to step 412. In step 412, CPU 1 supplies the parameter selected among those stored in main memory 2 that is required for transferring character patterns to bit map memory 10. This parameter is input to second selector 14. In step 413, second selector 14 selects the parameter supplied from CPU 1. In the next step 414, this parameter is set in parameter file 15. In step 416, CPU starts bitblt unit 100. In step 416, unit 100 reads the patterns of the characters of the type specified by the data set in parameter file 15, from font ROM 3, and then inputs these patterns to data-transferring circuit 6. In step 417, circuit 6 performs a logic operation on these patterns and the data stored in destination register 62, thereby providing display data, and writes this display data in bit map memory 10. In the next step 418, CPU 1 determines whether or not one character has been transferred. If NO, the flow returns to step 417. If YES, the flows goes to step 419. In step 419, CPU 1 determines whether one string of characters has been transferred to bit map memory 10. If NO, the flow returns to step 412, whereby steps 412 to 419 are repeated until the string of characters is transferred.

What is claimed is:

1. A data-processing apparatus having a font ROM and a bit map memory for holding character data to be displayed, said apparatus comprising:

a central processing unit for generating a list of parameters required to transfer character data forming one block of text;

memory means for storing said list of parameters; and a bit boundary block transfer unit for transferring said character data between the font ROM and the bit mapped memory, including:

a list pointer register for storing pointers representing locations where said parameters are stored in said memory means, a parameter file for storing the parameters required for transferring character data, a parameter control section for reading a parameter from said memory means in accordance with each of the pointers stored in said list pointer register, and for setting the parameter for one character of data in said parameter file, a data-transferring circuit for transferring character data, one character at a time, in accordance with the parameters stored in said parameter file, and an interruption circuit for determining that said data-transferring circuit has transferred the character data forming one block of text, and for generating an interrupt signal representing that the block of text has been transferred.

2. A data-processing apparatus having a font ROM and a bit map memory for holding character data to be displayed, said apparatus comprising:

a central processing unit for generating a list of parameters needed to transfer a single type of character data forming one block of text;

memory means for storing said list of parameters; and a bit boundary block transfer unit for transferring said character data between the font ROM and the bit mapped memory, including:

a list pointer register for storing pointers representing locations where said parameters are stored in said memory means, a parameter file for storing those of said parameters required for transferring character data, a parameter control flag register for holding a flag representing one of said parameters to be updated, a file address-updating control circuit for calculating an address of said parameter to be updated in said parameter file, in accordance with the contents of said parameter control flag register, a parameter control section for reading a parameter from said memory means in accordance with said pointers and also with said calculated address, and for setting one of said parameters for one character in said parameter file, a data transfer circuit for transferring character data, one character at a time, in accordance with said parameters stored in said parameter file, and an interrupt circuit for determining that said data transfer circuit has transferred the character data forming one block of text, and for generating an interrupt signal representing that the block of text has been transferred.

3. A data-processing apparatus having a font ROM and a bit mapped memory for holding character data to be displayed, said apparatus comprising:

a central processing unit for designating, in accordance with data stored in a register, a first parameter required for transferring one character; and a bit boundary block transfer unit, including:

a parameter memory for storing fixed parameters required for transferring character data for characters of the same type, a register for storing data representing the type of characters to be transferred, a first selector for supplying, in accordance with the data stored in said register, any parameter that has been output from said parameter memory and is required for transferring one character, a second selector for selecting the parameter supplied form said first selector when said register holds data representing the type of characters to be transferred, or for selecting said first parameter when said register does not hold data representing the type of characters to be transferred, a parameter file for storing the parameter selected by said second selector, and a data-transferring circuit for transferring character data, one character at a time, in accordance with the parameter stored in said parameter file.

4. A data-processing apparatus according to claim 1, wherein said parameter file has an area for storing a magnification/reduction factor, an area for storing the length of the block of text to be transferred, and an area for storing a parameter source address and a parameter destination address.

5. A data processing apparatus according to claim 2, wherein said parameter file has an area for storing a magnification/reduction factor, an area for storing the length of the block of text to be transferred, and an area for storing a parameter source address, and a parameter destination address.

6. A data-processing apparatus according to claim 3, wherein said parameter file has an area for storing a magnification/reduction factor, an area for storing the length of the block of text to be transferred, and an area for storing a source address and a destination address.

* * * * *

UNITED STATES PATENT AND TRADEMARK OFFICE
CERTIFICATE OF CORRECTION

PATENT NO. : 4,845,656

DATED : July 04, 1989

INVENTOR(S) : Shinji Nishibe et al.

It is certified that error appears in the above-identified patent and that said Letters Patent is hereby corrected as shown below:

On the title page under Foreign Application Priority Data, "Dec. 12, 1995" should be --Dec. 12, 1985--.

Claim 3, col. 8, line 43, "form" should be --from--.

Signed and Sealed this

Thirteenth Day of October, 1992

*Attest:*

DOUGLAS B. COMER

*Attesting Officer* *Acting Commissioner of Patents and Trademarks*